United States Patent
McConnell

(10) Patent No.: US 10,905,104 B2
(45) Date of Patent: Feb. 2, 2021

(54) MULTI-PURPOSE PET MAINTENANCE DEVICE

(71) Applicant: Peter McConnell, San Diego, CA (US)

(72) Inventor: Peter McConnell, San Diego, CA (US)

(*) Notice: Subject to any disclaimer, the term of this patent is extended or adjusted under 35 U.S.C. 154(b) by 0 days.

(21) Appl. No.: 16/562,305

(22) Filed: Sep. 5, 2019

(65) Prior Publication Data
US 2020/0128794 A1 Apr. 30, 2020

Related U.S. Application Data

(60) Provisional application No. 62/750,017, filed on Oct. 24, 2018.

(51) Int. Cl.
*A01K 5/01* (2006.01)
*A01K 7/00* (2006.01)
*A01K 29/00* (2006.01)
*A01K 23/00* (2006.01)

(52) U.S. Cl.
CPC .......... *A01K 23/005* (2013.01); *A01K 5/0121* (2013.01); *A01K 7/00* (2013.01)

(58) Field of Classification Search
CPC ...... A01K 5/0121; A01K 7/00; A01K 23/005; E01H 1/1206; E01H 2001/126
USPC .......................................................... 294/1.3
See application file for complete search history.

(56) References Cited

U.S. PATENT DOCUMENTS

| | | | | |
|---|---|---|---|---|
| 3,126,933 | A * | 3/1964 | Mason et al. | A01K 5/0114 383/33 |
| 3,978,540 | A * | 9/1976 | Peck | E01H 1/1206 294/1.3 |
| 4,768,818 | A * | 9/1988 | Kolic | A01K 23/005 294/1.3 |
| 5,039,148 | A * | 8/1991 | Brautovich | E01H 1/1206 294/1.3 |
| 5,318,334 | A * | 6/1994 | Madrid | A01K 1/0125 294/1.3 |
| 6,019,244 | A * | 2/2000 | Jones | A01K 5/0114 119/61.56 |
| 8,382,172 | B2 * | 2/2013 | Bardes | B65F 1/0006 294/1.3 |
| 9,010,565 | B2 * | 4/2015 | Warner | A01K 7/00 206/545 |
| 9,617,031 | B1 * | 4/2017 | Piechocinski | B65D 5/563 |
| 9,770,009 | B1 * | 9/2017 | Hagerman | A01K 7/00 |
| 9,826,718 | B2 * | 11/2017 | Dewey | A01K 27/008 |

(Continued)

*Primary Examiner* — Dean J Kramer
(74) *Attorney, Agent, or Firm* — Roeder & Broder LLP; James P. Broder

(57) ABSTRACT

A pet maintenance device for use by a user with a pet animal can be selectively moved to multiple positions for use for multiple purposes or applications. The pet maintenance device includes a device body that is selectively movable among a closed position, a partially open position, and a fully open position. The device body includes an outer body member and a foldable flap member that is connected to the outer body member. When the device body is in the closed position, the device body is substantially flat. When the device body is in the partially open position, the device body is configured to allow the user to grasp the foldable flap member to pick up pet waste. When the device body is in the fully open position, the device body is configured to be substantially bowl-shaped to be usable as a bowl for holding a consumable.

20 Claims, 6 Drawing Sheets

(56) References Cited

U.S. PATENT DOCUMENTS

2009/0199776 A1\* 8/2009 Alexander ............... A01K 7/06
119/61.56

\* cited by examiner

MULTI-PURPOSE PET MAINTENANCE DEVICE

RELATED APPLICATION

This application claims priority on U.S. Provisional Application Ser. No. 62/750,017 filed on Oct. 24, 2018, and entitled "MULTI-PURPOSE PET MAINTENANCE DEVICE". As far as permitted, the contents of U.S. Provisional Application Ser. No. 62/750,017 are incorporated in their entirety herein by reference.

BACKGROUND

Throughout the world, there are hundreds of millions of animal lovers and animal (or pet) owners. For example, there are estimated to be in excess of 43 million pet dogs in the United States alone. Pet owners generally recognize that, in order to keep dogs stronger and healthier, they must regularly be exercised, such as being taken for walks. Although requirements may vary depending upon the type of dog being considered, it is generally believed that a dog must be taken on one or more walks each day, for a total of at least thirty minutes.

Dogs regularly use their walks as a time to defecate. Since dogs are often walked in public places such as along sidewalks, in parks, or along rivers, if the dog's fecal waste (also referred to simply as "pet waste") is not removed, the public may suffer from environmental pollution. It is the responsibility of the dog's owner, or the dog walker, to properly dispose of the dog's feces. In fact, jurisdictions commonly have laws specifically requiring dog owners to pick up the pet waste. Thus, it is desired for the dog owner, or dog walker, to have a bag or another type of vessel with which they can pick up the pet waste when out in a public place.

Additionally, while going on walks, a dog often requires water so as avoid the possibility of dehydration. Dehydration is a lack of water in the body, and can cause serious complications for pets and people alike. Making sure that a dog gets the right amount of water each day can be a challenge. Therefore, it is also desired that a dog owner, or dog walker, have a means by which they can provide water for a dog to drink when they are out on walks, or otherwise out in a public place.

SUMMARY

The present invention is directed toward a pet maintenance device for use by a user with a pet animal. As described in detail herein, the pet maintenance device is a multi-purpose pet maintenance device that can be selectively moved to multiple positions for use for multiple purposes or applications. In various embodiments, the pet maintenance device includes a device body that is selectively movable among a closed position, a partially open position, and a fully open position. The device body includes an outer body member and a foldable flap member that is connected to the outer body member. When the device body is in the closed position, the device body is substantially flat. When the device body is in the partially open position, the device body is configured to allow the user to grasp the foldable flap member to pick up pet waste. When the device body is in the fully open position, the device body is configured to be substantially bowl-shaped to be usable as a bowl for holding a consumable.

In certain embodiments, when the device body is in the closed position, the foldable flap member is substantially surrounded by the outer body member.

Additionally, in some embodiments, after the user has picked up the pet waste when the device body is in the partially open position, the device body is movable to an inverted position so that the pet waste is retained therein.

Further, in certain embodiments, when the device body is in the fully open position, the outer body member forms at least one side of the bowl, and the foldable flap member forms a base of the bowl.

Additionally, in certain alternative embodiments, the foldable flap member can be coupled to the outer body member, or the foldable flap member can be integrally formed with the outer body member.

In various embodiments, the outer body member includes a base layer and a cover layer that is positioned on either side of the base layer to substantially enclose the base layer. In certain such embodiments, the base layer is formed from one of a plastic material and a paper material, and the cover layer is a metallic foil layer. Additionally, in such embodiments, the cover layer and the base layer can be hot-stamped to one another.

Additionally, in some embodiments, the foldable flap member includes a flap base layer and a flap cover layer that is positioned on either side of the flap base layer to substantially enclose the flap base layer. In such embodiments, the flap base layer can be formed from one of a plastic material and a paper material, and the flap cover layer can be a metallic foil layer. Further, the flap cover layer and the flap base layer can be hot-stamped to one another.

Further, in certain embodiments, the foldable flap member is sealingly connected to the outer body member so that the device body is liquid impermeable.

In other applications, the present invention is further directed toward a pet maintenance device for use by a user with a pet animal, the pet maintenance device including a device body that is selectively movable between a closed position and a fully open position, the device body including a base layer and a cover layer that is positioned on either side of the base layer to substantially enclose the base layer, the cover layer being a metallic foil layer that is hot-stamped onto the base layer; wherein when the device body is in the closed position, the device body is substantially flat; and wherein when the device body is in the fully open position, the device body is configured to be substantially bowl-shaped to be usable as a bowl for holding a consumable.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a multi-purpose and/or multi-application pet maintenance device (also sometimes referred to herein simply as a "pet maintenance device"). More specifically, in various embodiments, the pet maintenance device includes a device body, and the pet maintenance device and/or the device body are selectively movable by a user among a closed (folded) position, a partially open position, a fully open position, and an inverted position. It is appreciated that the pet maintenance device and/or the device body is configured to be used for different purposes and/or different applications when the device body is in each of the noted positions. For example, in different positions, as described in detail herein, the pet maintenance device can be (i) in the preferred position for storage and portability (i.e. the closed position), (ii) in the preferred position for picking up a dog's fecal waste (i.e. the partially open position), (iii) in the preferred position for disposing of the dog's fecal waste (i.e. in the inverted (or inside out) position), and (iv) in the preferred position to be substantially bowl-shaped such that the pet maintenance device can be used as a bowl for holding a consumable to be consumed by the dog, such as a water bowl for the dog (i.e. the fully open position).

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
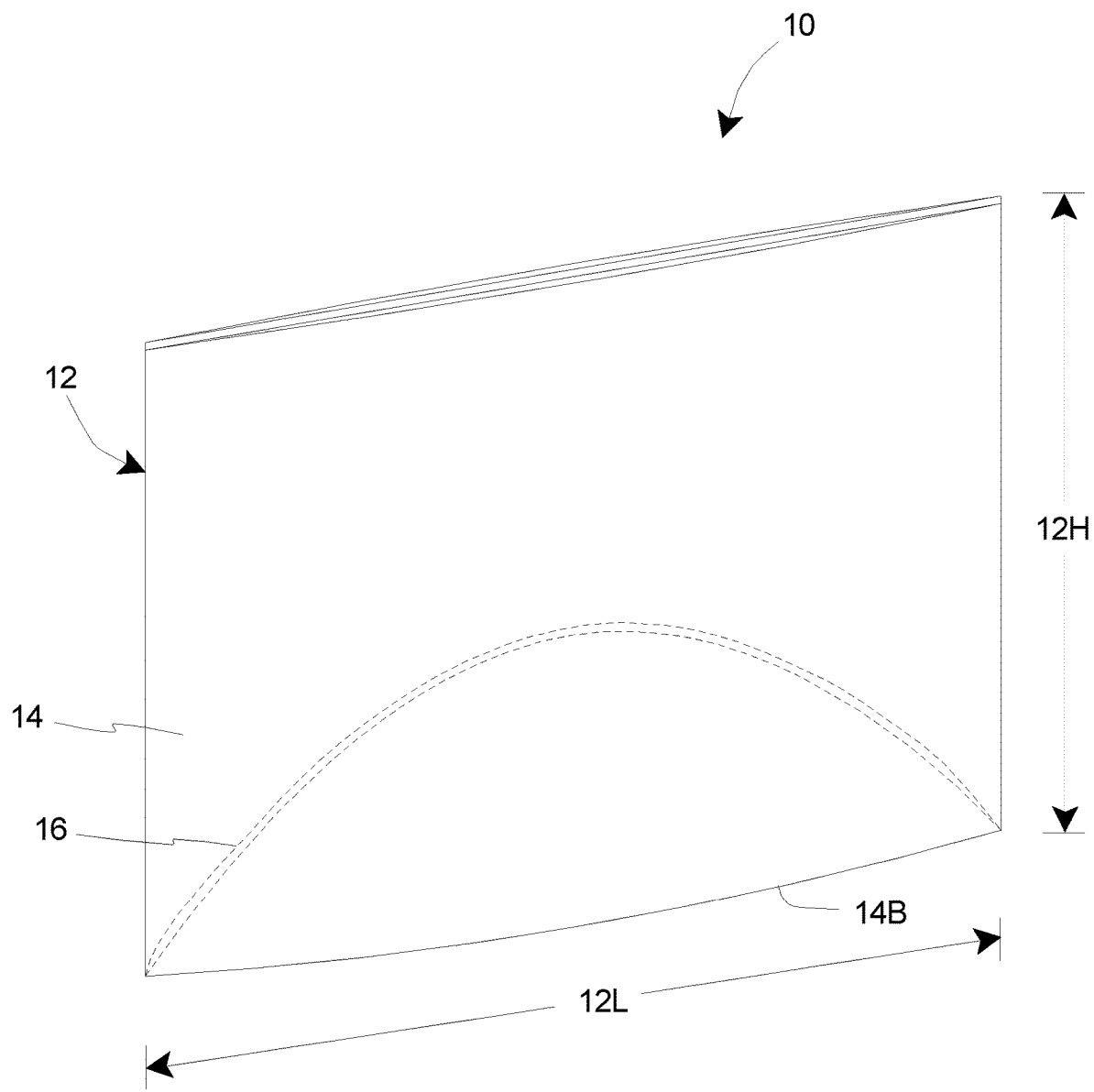
FIG. 1A is a simplified schematic perspective view illustration of an embodiment of a multi-purpose pet maintenance device having features of the present invention, shown in a closed position.

FIG. 1A is a simplified schematic perspective view illustration of an embodiment of a multi-purpose pet maintenance device 10 (also sometimes referred to herein simply as a "pet maintenance device") having features of the present invention. The design of the pet maintenance device 10 can be varied. In certain embodiments, as shown in FIG. 1A, the pet maintenance device 10 includes a device body 12 having an outer body member 14 and a foldable flap member 16 (or gusset, illustrated in phantom) that is connected to, e.g., coupled to and/or integrally formed with, the outer body member 14. Additionally, as provided herein, the foldable flap member 16 can be sealingly connected to the outer body member 14 such that the pet maintenance device 10 and/or the device body 12 is liquid impermeable. It is appreciated that the pet maintenance device 10 can include more features or fewer features than what is specifically shown in the Figures.

Figure 1B:
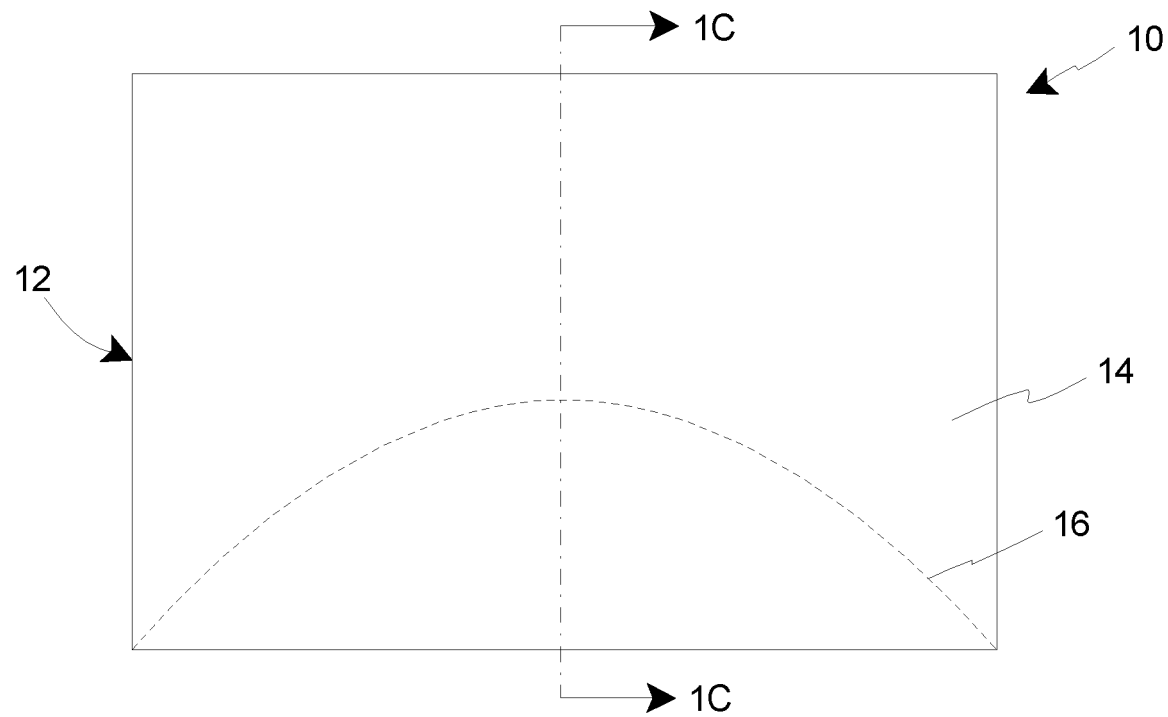
FIG. 1B is a simplified schematic side view illustration of the multi-purpose pet maintenance device illustrated in FIG. 1A, shown in the closed position.
Figure 1C:
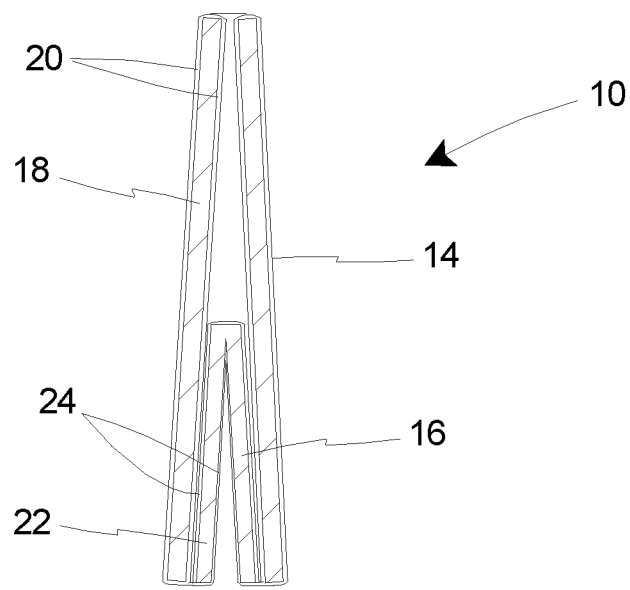
FIG. 1C is a simplified cutaway view of the multi-purpose pet maintenance device taken on line 1C-1C in FIG. 1B.
Figure 2A:
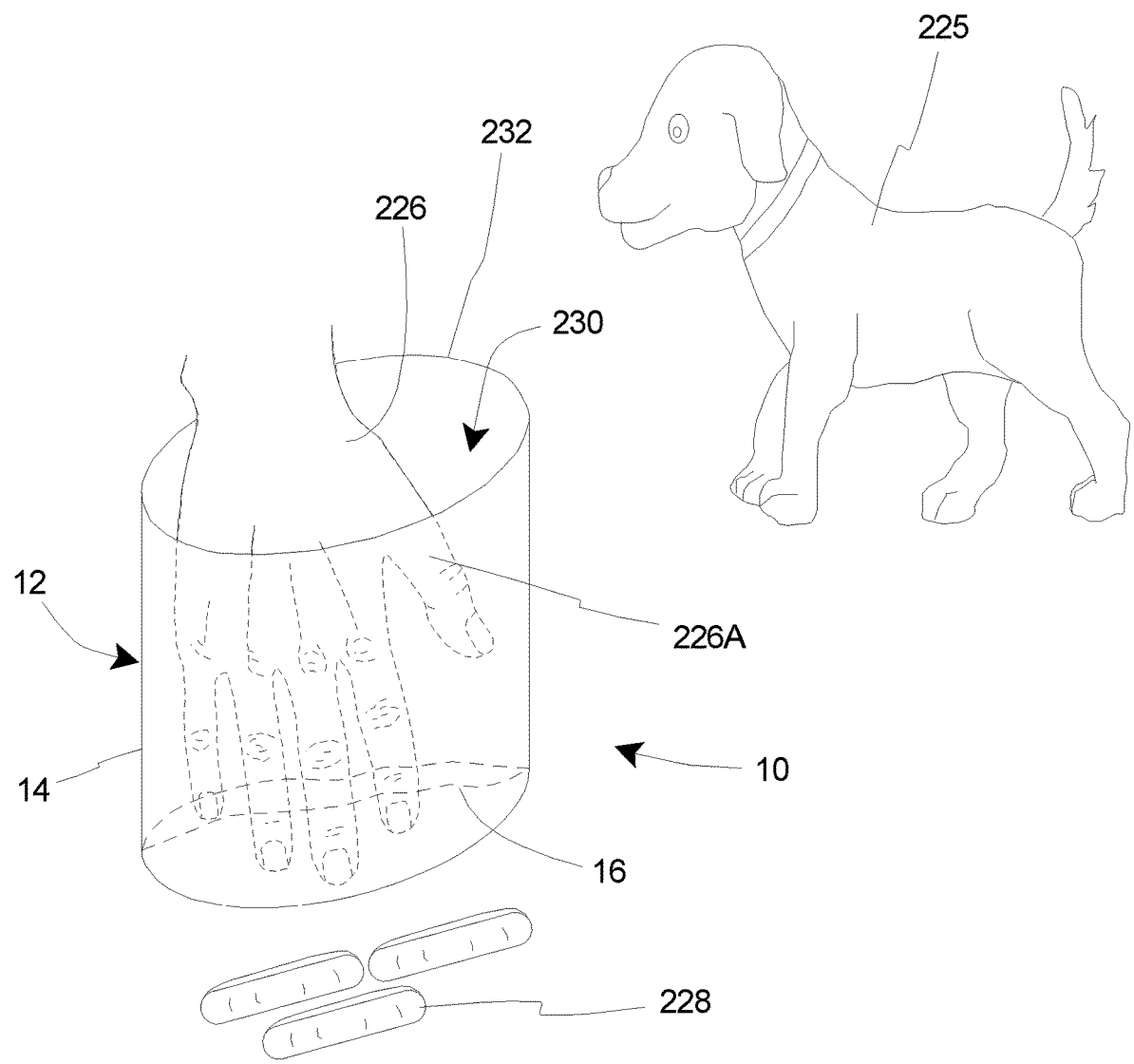
FIG. 2A is a simplified schematic perspective view illustration of a pet animal and the multi-purpose pet maintenance device illustrated in FIG. 1A, shown in a partially open position.
Figure 2B:
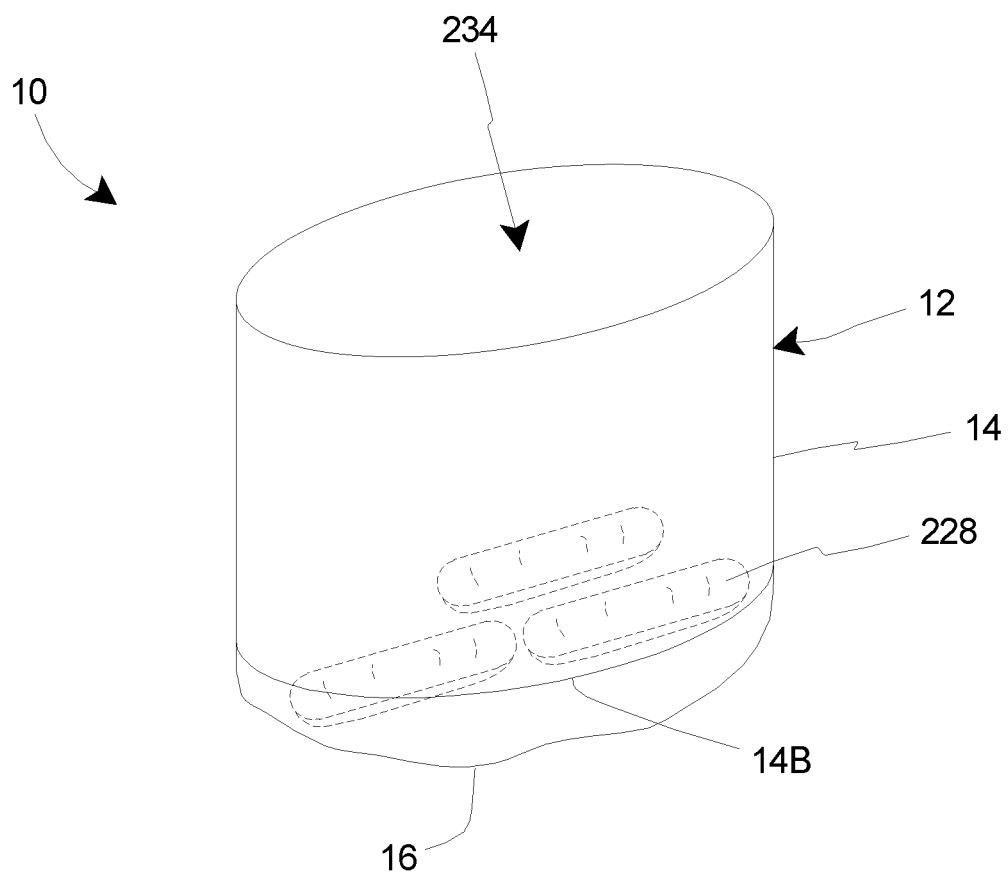
FIG. 2B is another simplified schematic perspective view illustration of the multi-purpose pet maintenance device illustrated in FIG. 1A, shown in an inverted position.
Figure 3A:
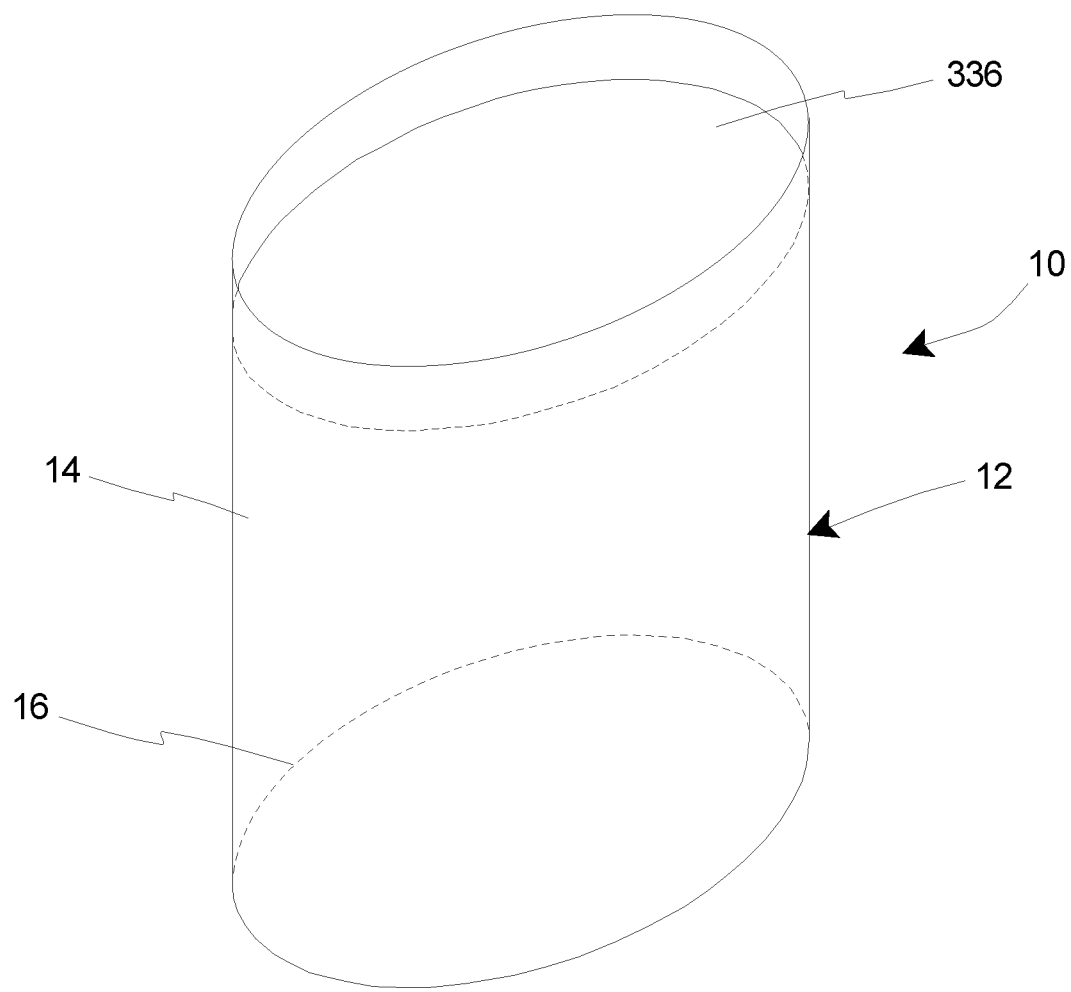
FIG. 3A is a simplified schematic perspective view illustration of the multi-purpose pet maintenance device illustrated in FIG. 1A, shown in a fully open position.
Figure 3B:
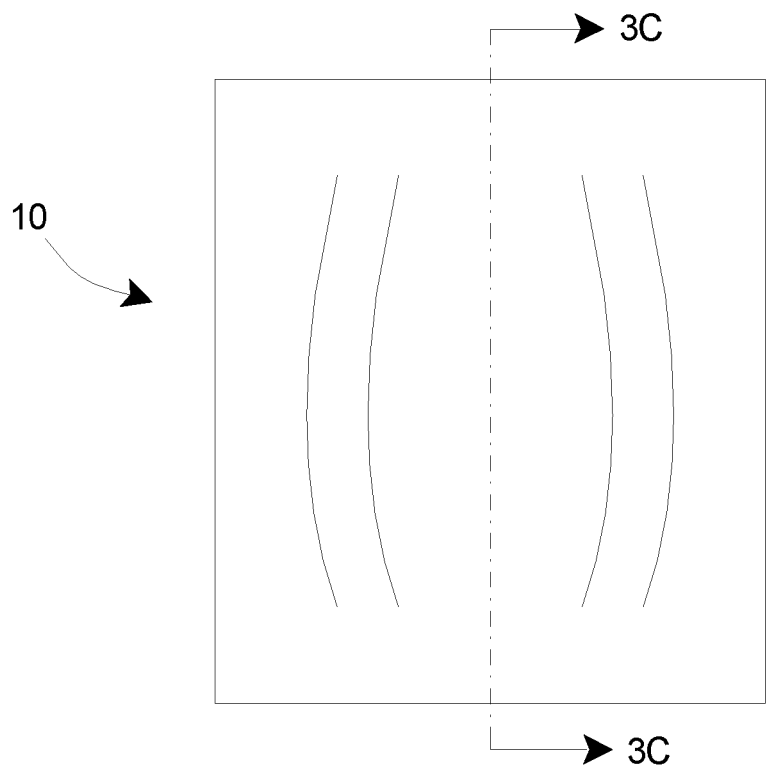
FIG. 3B is a simplified schematic side view illustration of the multi-purpose pet maintenance device illustrated in FIG. 1A, shown in the fully open position.
Figure 3C:
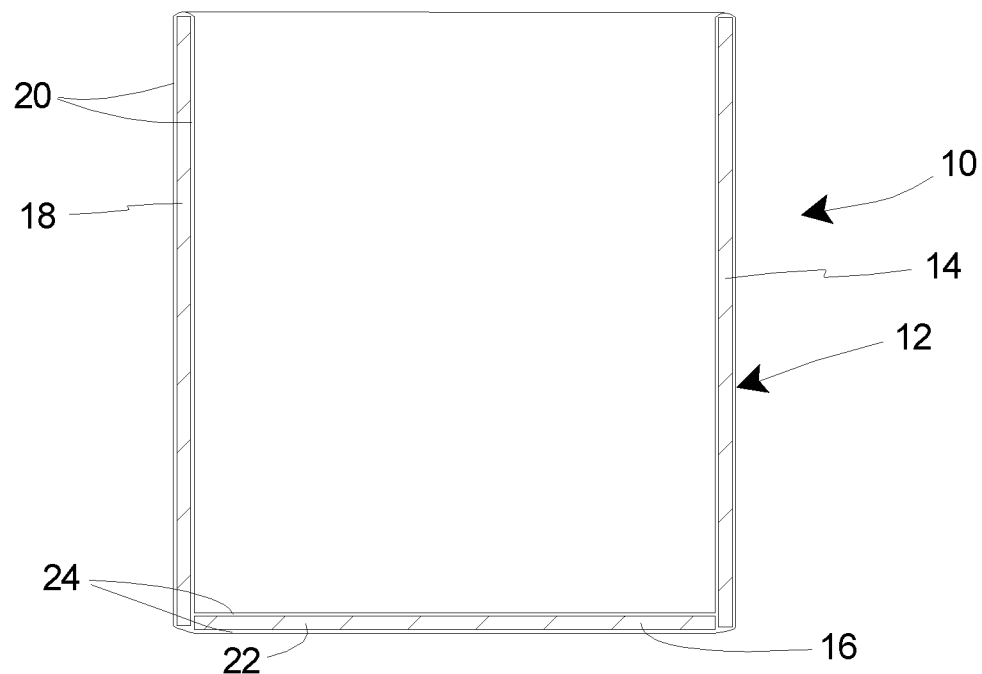
FIG. 3C is a simplified cutaway view of the multi-purpose pet maintenance device taken on line 3C-3C in FIG. 3B.

As provided in detail herein, the pet maintenance device 10 and/or the device body 12 is uniquely configured to be selectively moved among multiple positions, and being usable for multiple purposes and/or in multiple applications. More specifically, as illustrated herein, the pet maintenance device 10 and/or the device body 12 is selectively movable among a closed position (as shown in FIGS. 1A-1C), a partially open position (as shown in FIG. 2A), a fully open position (as shown in FIGS. 3A-3C), and an inverted position (as shown in FIG. 2B). It is appreciated that any of the positions of the pet maintenance device 10 can be referred to as a "first position", a "second position", a "third position", and/or a "fourth position". In FIG. 1A, as noted, the pet maintenance device 10 is shown in the closed position.

As shown in FIG. 1A, when the pet maintenance device 10 and/or the device body 12 is in the closed position, the device body 12 is substantially flat. Thus, the closed position, with the substantially flat device body 12, is more compact, and thus more efficiently positioned for purposes of storage and/or transport of the pet maintenance device 10.

The size and shape of the device body 12 when in the closed position can be varied. For example, in certain embodiments, when the device body 12 is in the closed position, the device body 12 can be substantially rectangular-shaped, and can have a length 12L of between approximately six inches and twelve inches, and a height 12H of between approximately four inches and eight inches. Alternatively, the device body 12 in the closed position can have a different shape, and/or can have dimensions that are different than, i.e. greater than or less than, the dimensions specifically disclosed herein above.

As noted above, the foldable flap member 16 can be coupled to and/or integrally formed with the outer body member 14. For example, in certain embodiments, the foldable flap member 16 can be configured to connect to a bottom edge 14B of the outer body member 14. Further, as shown, in some embodiments, when in the closed position, the foldable flap member 16 can have a somewhat semi-circular shape when it is folded over and positioned within the outer body member 14. Stated in another manner, when the pet maintenance device 10 and/or the device body 12 is in the closed position, the foldable flap member 16 can be substantially surrounded by the outer body member 14, i.e. can be positioned within a body interior 230 (illustrated in FIG. 2A) as defined by the outer body member 14.

As described herein below, such shape of the foldable flap member 16 enables the pet maintenance device 10 to have a substantially round bowl-shape when in the fully open position. It is appreciated that in different embodiments, when the pet maintenance device 10 is substantially round bowl-shaped when in the fully open position, the foldable flap member 16 can be formed as a substantially circular member that is folded over when in the closed position, or the foldable flap member 16 can include two semi-circular pieces that are bonded together in any suitable manner.

Alternatively, depending on the desired shape of the pet maintenance device 10 when in the fully open position, e.g., substantially round bowl-shaped, substantially oval bowl-shaped, substantially rectangular bowl-shaped, substantially square bowl-shaped, the foldable flap member 16 can have another suitable shape.

Additionally, the device body 12, i.e. the outer body member 14 and the foldable flap member 16, can be formed from any suitable materials. For example, in various embodiments, as shown in FIG. 1C, the device body 12 can be formed from multiple layers of materials. Since the multiple layers of the device body 12 are clearly illustrated in FIG. 1C, the potential materials for the device body 12 will be discussed in more detail in the discussion regarding FIG. 1C.

FIG. 1B is a simplified schematic side view illustration of the multi-purpose pet maintenance device 10, with the pet maintenance device 10 again being illustrated in the closed position. In particular, FIG. 1B provides another view of the device body 12, including the outer body member 14 and the foldable flap member 16 (illustrated in phantom). As noted above, and as shown in FIG. 1B, in this embodiment, the device body 12 is substantially rectangular-shaped when the device body 12 is in the closed position.

FIG. 1C is a simplified cutaway view of the multi-purpose pet maintenance device 10 taken on line 1C-1C in FIG. 1B. It is appreciated that the pet maintenance device 10 will likely have a flatter profile when in the closed position than what is specifically shown in FIG. 1C, with certain details being shown somewhat expanded in FIG. 1C for purposes of clarity.

As shown in FIG. 1C, each of the outer body member 14 and the foldable flap member 16 have a multi-layered configuration. More specifically, as illustrated, the outer body member 14 includes a base layer 18 and a cover layer 20 that is positioned on either side of the base layer 18. Thus, with such design, the cover layer 20 can substantially, if not completely, encircle and/or enclose the base layer 18, so that no portion of the base layer 18 is exposed.

The base layer 18 can be formed from any suitable materials. In some non-exclusive alternative embodiments, the base layer 18 can be formed from a plastic material such as low-density polyethylene (LDPE), polyethylene terephthalate (PET), or another suitable plastic material. Alternatively, the base layer 18 can be formed from a paper material, thin cardboard, or any other suitable materials.

Additionally, the cover layer 20 can also be formed from any suitable materials. For example, in certain embodiments, the cover layer 20 can be formed from a metallic foil material, which may be available in colors such as gold, silver, bronze, or copper to provide enhanced aesthetic value for the user. Alternatively, the cover layer 20 can be formed from a different material and/or can have a different color.

In some embodiments, the cover layer 20 can be hot-stamped onto the base layer 18. Hot foil stamping is a process of using heat and pressure to apply metallic foil to an underlying surface, such as the materials used for the base layer 18. Alternatively, the cover layer 20 can be formed onto and/or positioned to substantially enclose the base layer 18 in another suitable manner.

Somewhat similarly, in some embodiments, as shown, the foldable flap member 16 includes a flap base layer 22 and a flap cover layer 24 that is positioned on either side of the flap base layer 22. Thus, with such design, the flap cover layer 24 can substantially, if not completely, encircle and/or enclose the flap base layer 22, so that no portion of the flap base layer 22 is exposed.

Additionally, the flap cover layer 22 can be formed from any suitable materials. In some non-exclusive alternative embodiments, the flap base layer 22 can be formed from a plastic material such as low-density polyethylene (LDPE), polyethylene terephthalate (PET), or another suitable plastic material. Alternatively, the flap base layer 22 can be formed from a paper material, thin cardboard, or any other suitable materials.

Further, the flap cover layer 24 can also be formed from any suitable materials. For example, in certain embodiments, the flap cover layer 24 can be formed from a metallic foil material, which may be available in colors such as gold, silver, bronze, or copper to provide enhanced aesthetic value for the user. Alternatively, the flap cover layer 24 can be formed from a different material and/or can have a different color.

In some embodiments, the flap cover layer 24 can be hot-stamped onto the flap base layer 22. Alternatively, the flap cover layer 24 can be formed onto and/or positioned to substantially enclose the flap base layer 22 in another suitable manner.

It is appreciated that the material selected for the cover layer 20 and the flap cover layer 24 can be chosen to add some rigidity to the pet maintenance device 10, e.g., so the pet maintenance device 10 is sturdier when used as a bowl in the fully open position. Additionally, the choice of materials for the cover layer 20 and the flap cover layer 24 can be made to better provide sealing capability such that the pet maintenance device 10 is liquid impermeable.

Additionally, as provided herein, the specific materials used within the pet maintenance device 10 provide certain advantages for the user. For example, in embodiments that use plastic and foil materials to form the pet maintenance device 10, the pet maintenance device 10 has much greater structural rigidity when in the fully open position. As such, the pet maintenance device 10 can be easily stood open and upright for use in holding a consumable to be consumed by the dog, such as being used a water bowl and/or a food bowl for the dog.

Further, it is also appreciated that based on the similarity of the layered designs between the outer body member 14 and the foldable flap member 16, the base layer 18 and the flap base layer 22 can be referred to collectively as the "base layer" of the device body 12. Similarly, the cover layer 20 and the flap cover layer 24 can be referred to collectively as the "cover layer" of the device body 12.

FIG. 2A is a simplified schematic perspective view illustration of the multi-purpose pet maintenance device 10 illustrated in FIG. 1A. Additionally, as noted, FIG. 2A illustrates the multi-purpose pet maintenance device 10 being shown in the partially open position. Further, FIG. 2A also shows a pet animal 225, e.g., a dog, with which the pet maintenance device 10 can be used.

As illustrated in FIG. 2A, when the pet maintenance device 10 is in the partially open position, the pet maintenance device 10 can be used for the purpose of enabling a user 226 to pick up pet waste 228 of the pet animal 225. More specifically, as shown, the user 226 can reach into the body interior 230 of the device body 12, i.e. as defined by the outer body member 14, through an open top 232, and selectively grasp the foldable flap member 16 to pick up the pet waste 228. As shown in FIG. 2A, when the pet maintenance device 10 and/or the device body 12 is in the partially open position, the foldable flap member 16 is configured to still extend upward, at least to an extent, within the body interior 230. With such design, the foldable flap member 16 is easily graspable by the user 226, i.e. with a hand 226A of the user 226, such that the pet waste 228 can be picked up within an area created in an underside of the foldable flap member 16.

FIG. 2B is another simplified schematic perspective view illustration of the multi-purpose pet maintenance device 10 illustrated in FIG. 1A. In particular, as shown in FIG. 2B, the multi-purpose pet maintenance device 10 has now been moved to the inverted position. More specifically, the movement from the partially open position to the inverted position essentially entails turning the pet maintenance device 10 inside out. With such design, after the user 226 (illustrated in FIG. 2A) has picked up the pet waste 228, the user 226 can then selectively move the pet maintenance device 10 and/or the device body 12 to the inverted position so that the pet waste 228 is retained therein. Stated in another manner, the pet maintenance device 10 can be selectively moved to the inverted position so that the pet waste 228 is retained within an inverted body interior 234, as defined by the outer body member 14 and the foldable flap member 16. With the pet waste 228 being retained within the inverted body interior 234 of the pet maintenance device 10 in the inverted position, as shown, the foldable flap member 16 will typically hang down somewhat below the bottom edge 14B of the outer body member 14. Additionally, at such time, the pet waste 228, as retained within the inverted body interior 234 of the pet maintenance device 10, can be easily disposed of by the user 226.

As provided herein, it is appreciated that the specific design of the pet maintenance device 10, i.e. with the outer body member 14 and the foldable flap member 16, provides certain benefits to the user 226 of the pet maintenance device 10. For example, the foldable flap member 16 is configured to provide full coverage of the pet waste 228 before the pet maintenance device 10 is moved to the inverted position. More particularly, the deep gusset formed by the foldable flap member 16 cups over the pet waste 228 completely, thus positioning the pet waste 228 already on the inside of the pet maintenance device 10, i.e. when moved to the inverted position. With such design, the pet waste 228 can be more easily and completely picked up and retained within the pet maintenance device 10, while better inhibiting any undesired contact with the pet waste 228 for the user 226, which is much more likely with a typical pet waste removal bag.

FIG. 3A is a simplified schematic perspective view illustration of the multi-purpose pet maintenance device illustrated in FIG. 1A. Additionally, as illustrated in FIG. 3A, the multi-purpose pet maintenance device 10 is now being shown in a fully open position. As provided herein, when the pet maintenance device 10 and/or the device body 12 is in the fully open position, the pet maintenance device 10 is usable as a bowl for holding a consumable to the consumed by a pet animal 225 (illustrated in FIG. 2A). In particular, the outer body member 14 can include one or more sides that are configured to form outer sides of the bowl, and the foldable flap member 16 is configured to form a base, e.g., a substantially flat base, of the bowl. In one particular, non-exclusive application, when the pet maintenance device 10 and/or the device body 12 is in the fully open position, the device body 12 can be configured for use as a bowl for holding water 336 to be consumed by the pet animal 225.

The size and shape of the device body 12 when in the fully open position can be varied. For example, in certain embodiments, when the device body 12 is in the fully open position, the device body 12 can be substantially round bowl-shaped, and can have a diameter of between approximately three-and-a-half inches and eight inches. Alternatively, the device body 12 in the fully open position can have a different shape. For example, in certain non-exclusive alternative embodiments, the device body 12 in the fully open position can be substantially oval bowl-shaped, substantially rectangular bowl-shaped, or substantially square bowl-shaped. Still alternatively, the device body 12 in the fully open position can have dimensions that are different than, i.e. greater than or less than, the dimensions specifically disclosed herein above.

FIG. 3B is a simplified schematic side view illustration of the multi-purpose pet maintenance device 10 illustrated in FIG. 1A, the multi-purpose pet maintenance device 10 again being shown in the fully open position.

FIG. 3C is a simplified cutaway view of the multi-purpose pet maintenance device 10 taken on line 3C-3C in FIG. 3B. In particular, as shown, the outer body member 14 can include and/or encompass one or more sides that are configured to form the outer sides of the bowl, and the foldable flap member 16 can be configured to form the base, e.g., the substantially flat base, of the bowl.

Additionally, FIG. 3C also illustrates the multiple layers that can form the outer body member 14 and the foldable flap member 16. More specifically, FIG. 3C again illustrates that the outer body member 14 can include the base layer 18 and the cover layer 20 that is positioned on either side of the base layer 18 to substantially encircle and/or enclose the base layer 18; and the foldable flap member 16 can include the flap base layer 22 and the flap cover layer 24 that is positioned on either side of the flap base layer 22 to substantially encircle and/or enclose the flap base layer 22. As noted above, with such design, and with materials such as noted above being used, the device body 12 can be substantially liquid impermeable, and thus easily usable as a water bowl for the pet animal 225 (illustrated in FIG. 2A).

Further, as noted above, the specific materials intended for use within the pet maintenance device 10, e.g., plastic material base with a foil cover layer, provides enhanced structural integrity for the pet maintenance device 10 when used in the fully open position. More specifically, the combination of the foil and plastic materials allows the pet maintenance device 10 to be stood upright while holding water or food, whereas typical pet waste removal bags do not use foil, and thus do not provide such structural integrity.

It is understood that although a number of different embodiments of the pet maintenance device 10 have been illustrated and described herein, one or more features of any one embodiment can be combined with one or more features of one or more of the other embodiments, provided that such combination satisfies the intent of the present invention.

While a number of exemplary aspects and embodiments of the pet maintenance device 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A pet maintenance device for use by a user with a pet animal, the pet maintenance device comprising:
   a device body that is selectively movable among a closed position, a partially open position, and a fully open position, the device body including an outer body member and a foldable flap member that is connected to the outer body member, the outer body member including a base layer and a cover layer that substantially encloses the base layer, the cover layer being formed from a metallic foil material;

wherein when the device body is in the closed position, the device body is substantially flat;

wherein when the device body is in the partially open position, the device body is configured to allow the user to grasp the foldable flap member to pick up pet waste; and wherein when the device body is in the fully open position, the device body is configured to be substantially bowl-shaped to be usable as a bowl for holding a consumable.

2. The pet maintenance device of claim 1 wherein when the device body is in the closed position, the foldable flap member is substantially surrounded by the outer body member.

3. The pet maintenance device of claim 1 wherein after the user has picked up the pet waste when the device body is in the partially open position, the device body is movable to an inverted position so that the pet waste is retained therein.

4. The pet maintenance device of claim 1 wherein when the device body is in the fully open position, the outer body member forms at least one side of the bowl, and the foldable flap member forms a base of the bowl.

5. The pet maintenance device of claim 1 wherein the foldable flap member is coupled to the outer body member.

6. The pet maintenance device of claim 1 wherein the foldable flap member is integrally formed with the outer body member.

7. The pet maintenance device of claim 1 wherein the base layer is formed from one of a plastic material and a paper material, and wherein the cover layer is a metallic foil layer.

8. The pet maintenance device of claim 7 wherein the cover layer is formed onto the base layer.

9. The pet maintenance device of claim 1 wherein the foldable flap member includes a flap base layer and a flap cover layer that encloses the flap base layer; wherein the flap base layer is formed from one of a plastic material and a paper material, and the flap cover layer is a metallic foil layer.

10. The pet maintenance device of claim 9 wherein the flap cover layer is formed onto the flap base layer.

11. The pet maintenance device of claim 1 wherein the foldable flap member is sealingly connected to the outer body member so that the device body is liquid impermeable.

12. A pet maintenance device for use by a user with a pet animal, the pet maintenance device comprising:

a device body that is selectively movable between a closed position and a fully open position, the device body including a base layer and a cover layer that substantially encloses the base layer, the cover layer being a metallic foil layer that is formed onto the base layer;

wherein when the device body is in the closed position, the device body is substantially flat; and wherein when the device body is in the fully open position, the device body is configured to be substantially bowl-shaped to be usable as a bowl for holding a consumable.

13. The pet maintenance device of claim 12 wherein the base layer of the device body is formed from one of a plastic material and a paper material.

14. The pet maintenance device of claim 12 wherein the device body includes an outer body member and a foldable flap member that is connected to the outer body member.

15. The pet maintenance device of claim 14 wherein when the device body is in the closed position, the foldable flap member is substantially surrounded by the outer body member.

16. The pet maintenance device of claim 14 wherein the device body is further selectively movable to a partially open position, and wherein when the device body is in the partially open position, the device body is configured to allow the user to grasp the foldable flap member to pick up pet waste.

17. The pet maintenance device of claim 16 wherein after the user has picked up the pet waste when the device body is in the partially open position, the device body is movable to an inverted position so that the pet waste is retained therein.

18. The pet maintenance device of claim 14 wherein when the device body is in the fully open position, the outer body member forms at least one side of the bowl, and the foldable flap member is configured to form a base of the bowl.

19. The pet maintenance device of claim 18 wherein the foldable flap member is sealingly connected to the outer body member so that the device body is liquid impermeable.

20. A pet maintenance device for use by a user with a pet animal, the pet maintenance device comprising:

a device body that is selectively movable between a closed position, a partially open position, and a fully open position, the device body including an outer body member and a foldable flap member that is connected to the outer body member, one of the outer body member and the foldable flap member being substantially enclosed by a cover layer, the cover layer being formed from a metallic foil material;

wherein when the device body is in the closed position the device body is substantially flat, when the device body is in the partially open position the device body is configured to allow the user to grasp the foldable flap member to pick up pet waste, and when the device body is in the fully open position the device body is configured to be substantially bowl-shaped to be usable as a bowl for holding a consumable.

* * * * *